United States Patent
Verner et al.

[15] 3,697,719
[45] Oct. 10, 1972

[54] PULSE NARROWING AND CUT-OFF PROTECTION SYSTEM FOR ELECTRICAL DISCHARGE MACHINING

[72] Inventors: Dalton R. Verner, Orchard Lake; Ronald L. Syria, Utica, both of Mich.

[73] Assignee: Elox Inc., Davidson, N.C.

[22] Filed: March 10, 1971

[21] Appl. No.: 122,936

[52] U.S. Cl. ............................... 219/69 S, 219/69 C
[51] Int. Cl. ................................................ B23p 1/08
[58] Field of Search ................... 219/69 C, 69 P, 69 S

[56] References Cited

UNITED STATES PATENTS

| | | |
|---|---|---|
| 3,539,755 | 11/1970 | Inoue ...................... 219/69 P |
| 3,588,428 | 6/1971 | Sennowitz ............. 219/69 C X |
| 3,590,317 | 6/1971 | Sennowitz ............. 219/69 S X |
| 3,614,368 | 10/1971 | Lobur ...................... 219/69 P |

Primary Examiner—R. F. Staubly
Attorney—Hauke, Gifford & Patalidis

[57] ABSTRACT

A protection circuit is provided which senses and responds to gap short circuit condition during machining pulse on-time. Responsive to such condition, a machining current cut-off function is exercised by a complementary pair of electronic switches which operate with positive action to control pulser operation by decreasing the "on" time of the pulser and decreasing off-time. An additional means is provided for appropriate limiting machining current by sensing gap open circuit condition during pulse on-time and correspondingly, through the operation of a complementary pair of electronic switches, increasing the "off" time of the pulser.

23 Claims, 2 Drawing Figures

United States Patent
Verner et al.
[15] 3,697,719
[45] Oct. 10, 1972
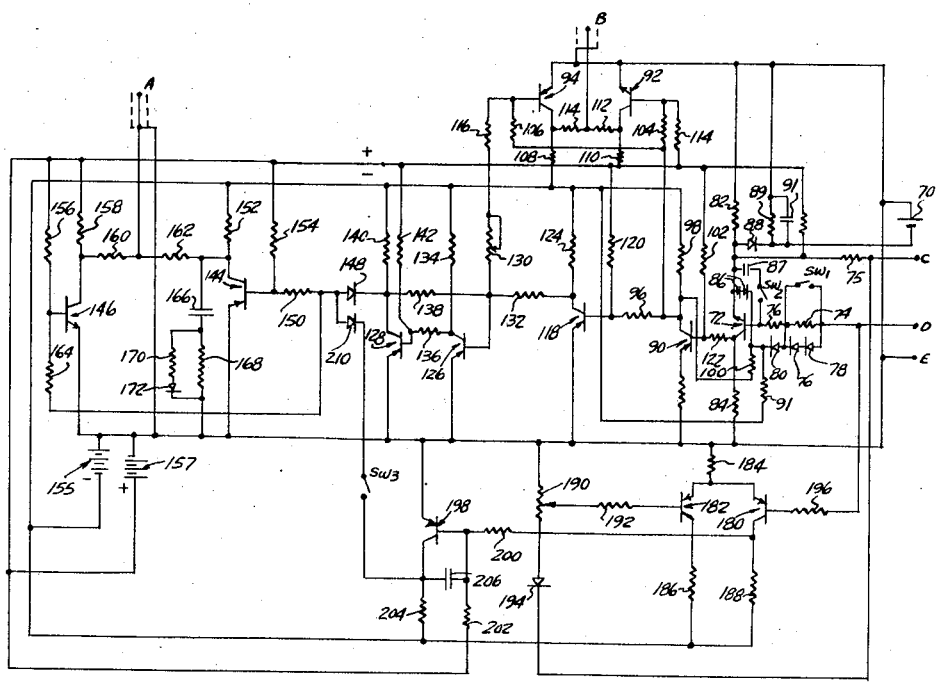

INVENTORS
DALTON R. VERNER
RONALD L. SYRIA

BY Hauke, Gifford & Patalidis

ATTORNEYS

PULSE NARROWING AND CUT-OFF PROTECTION SYSTEM FOR ELECTRICAL DISCHARGE MACHINING

BACKGROUND OF THE INVENTION

The field to which our invention relates is that known as electrical discharge machining in which material is removed from an electrically conductive workpiece by the erosive action of electrical gap discharges passed between a tool electrode and the workpiece. An electrode or a workpiece servo feed system is used to provide relative movement to maintain an optimum gap spacing between the electrode and the workpiece as material is removed. A dielectric liquid coolant is circulated and recirculated under pressure through the gap during machining operation. For most reliable and predictable results, an EDM circuit of the independent pulser type is employed to provide machining power pulses of precisely controllable frequency and on-off time. In this type of circuit, the pulser is usually embodied as a multivibrator or the like. During the electrical discharge machining operation, the gap may become bridged by workpiece or electrode particles to cause a condition known as gap short circuit. This condition is usually accompanied by excessive localized heat which tends to damage both electrode and workpiece unless timely corrective action is taken. Various prior art systems have been devised to provide this corrective action either through fast acting servo withdrawal or through control of the current passed to the gap. Current control is normally exercised through control of the pulser itself, through increase of "off" time or decrease of "on" time or through total interruption of the operation of the pulser until the short circuit condition is alleviated.

It has also been found advantageous to limit cutting current during gap open circuit condition which condition presents particular problems during downfeed at the beginning of an electrical discharge machining operation. Current limiting is particularly important where the electrode has a number of protuberances in its surface and cutting is being initiated on a very small workpiece area. We have found it is possible to limit current cutting by increasing the "off" time of the cutting pulses themselves. In this manner, cutting current limiting is achieved without sacrificing the electrode extremely low wear characteristics normally available from long pulse on-time operation.

DESCRIPTION

Figure 1:
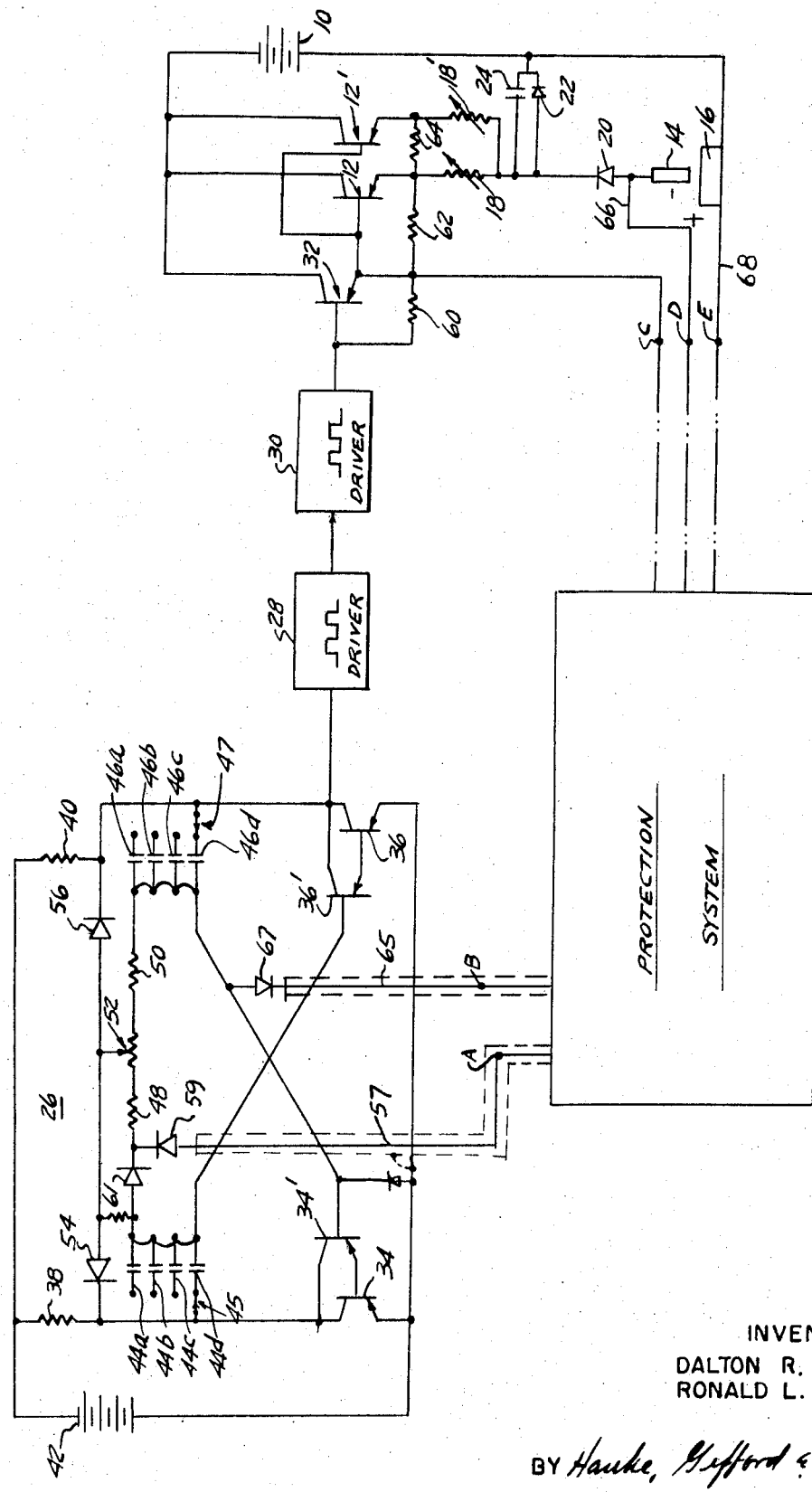
FIG. 1 is a combined schematic and block diagrammatic drawing of an electrical discharge machining power circuit with a protection system according to our invention shown in block diagram form.

Referring now to FIG. 1, the main machining power source 10 is shown connected in series with the power conducting or principal electrodes of a pair of parallel connected output stage transistors 12, 12' and in series with the machining gap which includes tool electrode 14 and workpiece 16. Gap current level is selectively controlled by the magnitude of series resistors 18, 18'.

A rectifier 20 is included in series between electrode 14 and the output stage transistors 12, 12' to permit high gap voltage operation without resultant damage to those transistors. The network including a diode 22 and a capacitor 24 is also included to connect transistors 12, 12' to the positive terminal of DC source 10 and to eliminate damaging high voltage spikes. A pulser or multivibrator stage 26 and several intermediate driver stages 28, 30 and 32 are used to turn the output stage transistors 12, 12' on and off with precisely controllable pulse duty factor. In the interest of simplification, the driver stages 28 and 30 have been illustrated in block diagram form.

The multivibrator 26 includes transistor pairs 34, 34' and 36, 36'. These transistor pairs are biased and coupled for alternate switching operation in the astable multivibrator mode. The two respective transistor pairs are themselves compound connected in the Darlington configuration and operate as single electronic switching units to provide the necessary current amplification. The transistors 34 and 36 are each connected through a pair of load resistors 38 and 40, the negative terminal of a DC source 42. A bank of cross coupling capacitors 44a through 44d and 46a through 46d are connected to the multivibrator switches through the selective setting of switches 45 and 47, respectively. It will be seen that switches 45 and 47 function to cross couple the collectors of the two transistors 34, 36 each to the opposing transistor pair base to control multivibrator pulse frequency and, accordingly, to control the frequency of the machining power pulses provided to the machining gap. The switches 45 and 47 are normally connected for ganged operation as shown by dash lines. A pair of current limiting resistors 48 and 50 and a potentiometer 52 are included in the multivibrator circuit with the machining pulse on-off time controlled by the setting of the movable contact of the potentiometer 52. A pair of blocking diodes 54, 56 are further connected in circuit with the movable contact of the potentiometer 52. Also included in the multivibrator 26 are a pair of control input networks which control the off-time of the miltivibrator 26 through the transistor 34 or provide for reduction of the multivibrator 26 on-time through the transistor 36. The first such input network includes a lead 57, and diodes 59 and 61 coupled as shown. The second control input network includes a lead 65 and a diode 67 which provide an input to control the on-time of the multivibrator transistor 36. A shielded connection of the two input leads is utilized. The multivibrator control from the protection system will be discussed in more complete detail in connection with FIG. 2 hereinafter.

The pulse output indicated from the multivibrator 26 is suitably amplified and resquared through the several intermediate drive stages 28, 30 and 32 to render the output transistors 12, 12' alternately conductive and non-conductive and therefore to provide machining power pulses across the machining gap. Pulse on-time is controlled in phase with the conduction of the transistors 36, 36'. Pulse off-time is controlled in phase with the conduction of the transistors 34, 34'. It will be noted that while the present invention utilizes transistors as the electronic switches, the invention is not so limited but, with proper redesign of the circuit by one skilled in the art, any electronic switch may be substituted. By "electronic switch" is meant any electronic control device having three or more electrodes comprising at least two power or principal electrodes acting to control current flow in the power circuit, the conductivity of the power circuit being controlled by a control electrode within the switch whereby the conductivity of the power circuit is controlled statically or electrically without movement of any mechanical elements within the switch itself. Included within this definition are electron tubes, transistors, semiconductor controlled rectifiers, thyratrons and like devices. With respect to the above mentioned several drive and output stage transistors, a plurality of resistors 60, 62 and 64 are connected in the manner illustrated to protect the base emitter junctions of their respective transistors from excess turn off voltages.

Figure 2:
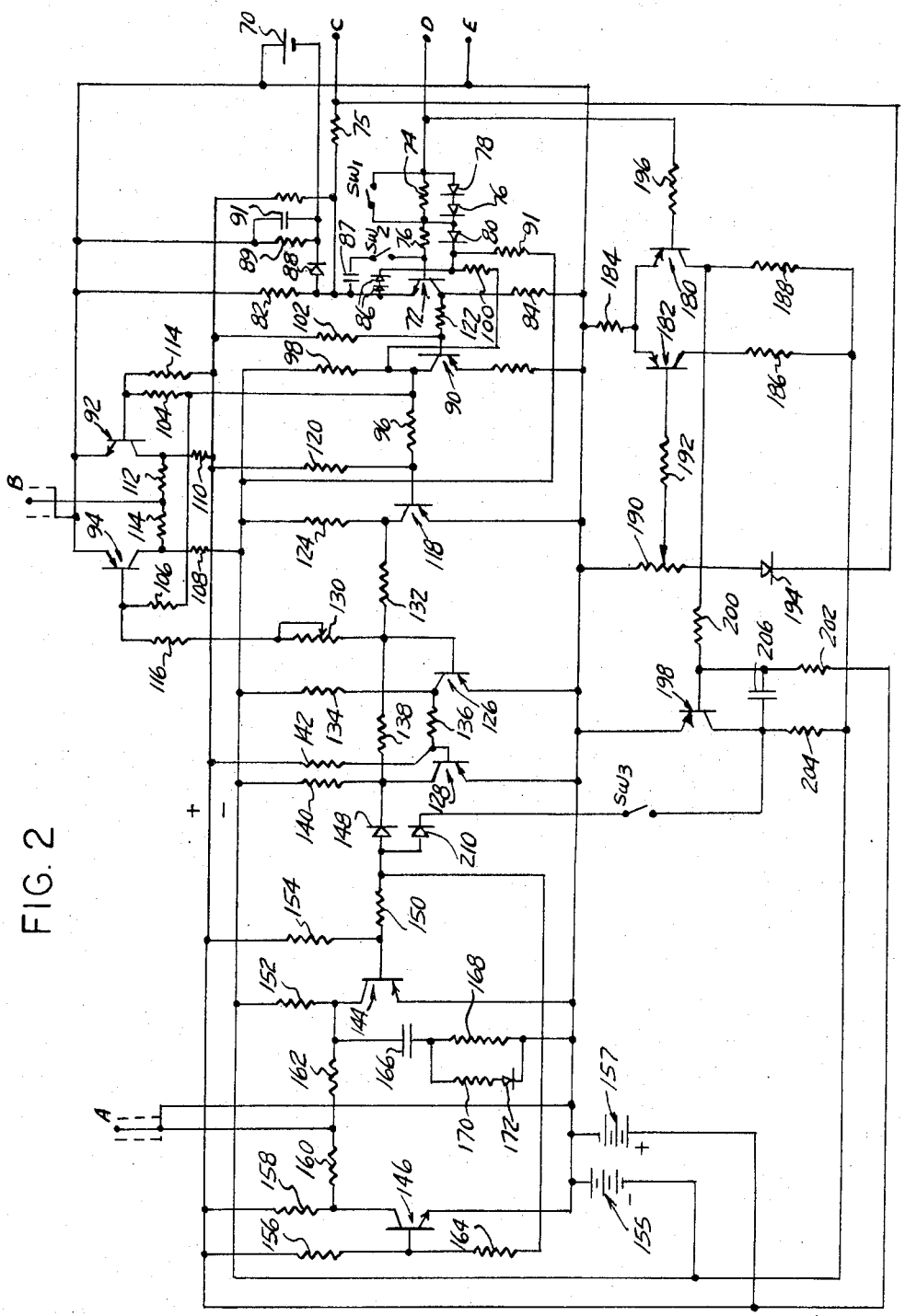
FIG. 2 is a detailed schematic drawing of the protection system employed.

The circuit previously indicated in FIG. 1 in block form as the "Protection System" is now shown in its full detail in FIG. 2. In the upper right hand section of FIG. 2 is shown that portion of the protection system which relates to the narrowing of the output pulse on-time during gap short circuit condition while the portion at the lower right hand section is that portion which relates to limiting of gap current during gap open circuit condition. Increased pulse off-time is achieved through the control of the conduction of the transistors 34, 34' of the multivibrator 26. The protection system includes a cut-off electronic switch embodied as a transistor 72 which transistor is shown at the right hand side of the drawing. The input includes a pair of leads 66 and 68 which are connected respectively to the tool electrode 14 and to the workpiece 16 with the respective negative and positive polarities included on the drawing. A fixed reference voltage source 70 is connected to the emitter of the transistor 72 through a diode 88. A parallel network including a resistor 89 and a capacitor 91 is connected between a reference voltage and the cathode of diode 88. A keying signal from the emitter of the drive stage transistor 32 is also provided in the emitter of the transistor 72. The keying signal amplitude is clamped to that of the reference voltage 70 through the diode 88. This keying signal and reference voltage have a purpose that will be explained more fully hereinafter in the section entitled "Description of Operation". The transistor 72 also receives at its base a signal input representative of gap voltage from the minus gap terminal of the workpiece 14. The signal input to the transistor 72 base is through the network including series connected resistors 74 and 76. The resistor 74 is shunted by two series diodes 76, 78 while the resistor 76 is shunted by a similarly poled diode 80. It will be understood that resistor 74 is included in the circuit only during relatively high voltage machining operation. To permit the shunting of resistor 74 from the circuit, the switch SW1 is included in parallel with the resistor 74. A second switch SW2 is included in the circuit to provide a delay if desired. Responsive to the closure of the switch SW2, a capacitor 87 is included in the circuit to provide energy storage and a resultant delay in the switching of the transistor 72. The transistor 72 further has resistors 82 and 84 connected in series with its emitter and collector, respectively. A pair of protective diodes 86 are connected across the base emitter junction of the transistor 72. The negative gap signal applied to the base of the transistor 72 during normal cutting condition is negative with respect to the keyed reference voltage supplied to its emitter. The output signal from the collector of the cut-off transistor 72 is used to control a subsequent switching stage comprising transistor 90. The transistor 90 in turn controls the change of state of a complementary pair of NPN and PNP transistors 92 and 94 to provide the control of the operation of the multivibrator 26 through decrease of its on-time. The stage associated with the transistor 90 includes a drive signal limiting resistor 96, a load resistor 98 and a feedback resistor 100 connected back to the base of the cut-off transistor 72. The signal input provided to the complementary transistor pair is taken from the collector of the transistor 90 and passed through drive limiting resistors 104 and 106 to the respective bases of the transistors 94, 92. A pair of load resistors 108, 110 are connected to the collectors of the transistors 94 and 92, respectively. The signal output is taken from the collectors of the transistors 92, 94 through series resistors 112, 114. It will be noted that the control output signal from the transistors 92, 94 is passed through a coaxial shielded connection and through the diode 67. The signal output is of minus polarity of the base of the off-time control transistor 34. The resultant turn on of transistor 34 turns off the on-time transistor 36 to reduce the on-time of the multivibrator 26 and of the machining power pulses to the gap. Suitable bias voltages to the bases of the transistors 92, 94 are provided through resistors 114, 116. A following transistor stage including a transistor 118 is coupled in the circuit with its bias resistor 120, a signal limiting resistor 122 and a load resistor 124. It will be seen that the protection system stages through that stage including the transistor 90 serve to control machining pulse on-time. The subsequent stages beginning with transistor 118 operate to exercise control over machining pulse off-time. The next following stage includes a pair of transistors 126 and 128. The transistors 126 and 128 are either on or off and have their triggering level preset by a variable resistor 130. The transistor 126 has connected in series with its base a current limiting resistor 132 and coupled to its collector a load resistor 134. A drive signal limiting resistor 136 is connected between the collector of the transistor 126 and the base of the transistor 128. A feedback resistor 138 is coupled between the collector of the transistor 128 and the base of the transistor 126. The transistor 128 further has in series with its collector a load resistor 140, and connected to its base a bias resistor 142. The control over pulse off-time is exercised through the switching of the second complementary pair of transistors including transistors 144 and 146. Incorporation of this complementary pair like that of the pair including transistors 92, 94 has been found to be of particular advantage in that the change of state and the signal output assure more positive operation and control of the multivibrator 26.

With further reference to the circuit for controlling pulse off-time, there is provided in series with the base of the PNP transistor 144 a diode 148 and a signal resistor 150. A load resistor 152 and a bias resistor 154 are further connected to the collector and base, respectively, of the transistor 144. The NPN transistor 146 has a bias resistor 156 connected to its base and a load resistor 158 connected in series with its collector. A pair of separate drive voltage sources 155 and 157 are connected in the circuit with the polarities shown. The output signal from the complementary pair is taken from the junction between resistors 160 and 162 and passed to the multivibrator 26 in the manner shown through the lead 57 and the diode 59. A shielded signal connection is incorporated in the same manner as that shown in connection with the control output to the on-time control end of the multivibrator 26. Responsive to the switching of the transistors 144 and 146 a plus output is provided to rob the minus drive signal to the base of on-time transistor 36'. This reduces the on-time of the transistor 36 and correspondingly increases the machining power pulse off-time. A protection diode 148 is connected between the base of transistor 34' and the plus terminal of the DC source 42. The switching of the transistors 144, 146 is provided by the error signal output from the transistor 128 in a manner that will be further explained in the "Description of Operation" section hereinafter. The signal resistor in series with the base of transistor 146 is is identified by the numeral 164. A delay stage is incorporated in circuit with transistor 144 which stage includes a capacitor 166, a resistor 168 and a shunt network including a resistor 170 and a diode 172.

In addition to the above described circuitry which is provided to properly adjust machining pulse on and off time as a result of gap short circuit condition, provision is made for increasing pulse off-time during gap open circuit condition. This circuit is normally activated at the beginning of an EDM operation when cutting first is begun and before the electrode has become fully seated in its cutting operation. Quite often, the electrode 14 will have protuberances of relatively small size which when placed opposite the workpiece 16 tend to concentrate current and increase the possibility of DC arcing or of gap short circuit.

The gap open circuit control portion of the system is shown at the bottom of FIG. 2 and is connected to the negative gap terminal to sense gap voltage through lead D in the same manner that the gap voltage is sensed to control the operation of the short circuit cut-off transistor 72. A pair of PNP transistors 180 and 182 are shown with their emitters connected to a suitable bias through a resistor 184. Load resistors 186 and 188 are connected in series with the corresponding collectors of the transistors 182 and 180. A reference voltage is preset by a potentiometer 190 and passed through a limiting resistor 192 to the base of the transistor 182. The reference voltage provided by potentiometer 190 is coupled to a keying signal which signal is again derived from the emitter of the drive stage transistor 32 with a diode 194 connected in series. Thus, provision is made for a per pulse comparison between a preset reference voltage and the gap voltage passed through the resistor 196 to the base of the transistor 180. When the gap voltage sensed is above the preset voltage level of the potentiometer 190, the transistor 182 will be turned off and the transistor 180 will be turned on so that a turn off signal is passed to a following transistor 198. A signal limiting resistor 200 is connected in series between the collector of the transistor 180 and the base of the transistor 198. The transistor 198 further is connected to a bias resistor 202 and a collector load resistor 204 with a delay capacitor 206 connected between the collector and base of the transistor 198 to operate as an integrator or energy storage element and prevent too rapid change of state of off-time. With the switch SW3 in its closed automatic current limiting position, it will be seen that the transistor 180 will turn the transistor 198 off. Responsive to the turn off of transistor 198, a negative signal will be applied through the diode 210 and the series resistor 150 to the base of transistor 144 to turn it on and to turn off the transistor 146 of the complementary pair. For an open circuit condition, the diode 148 will provide no minus signal since the transistor 128 remains in its on condition. Transistor 198 remains non-conductive during continuing open circuit condition of the gap and the minus signal applied to transistor 144 holds it on to widen the off-time and continue to limit the current being furnished to the gap. Upon return to normal gap cutting conditions as shown by normal gap voltage, the transistor 180 will be once more returned to its non-conductive condition, and transistor 198 will again be turned on.

DESCRIPTION OF OPERATION

The operation of the protection circuit will now be described with particular reference to the schematic of FIG. 2. Consideration will first be given to the operation of the protection system during gap short circuit condition. When the gap voltage sensed drops below normal machining level, it will be compared to the keyed reference voltage which is taken off the emitter of the drive transistor 32 and developed through resistor 75 and passed to the emitter of the transistor 72. The keying operation is such that each pulse is sensed during its on-time to determine whether the voltage level requires current reduction. Whenever the negative gap voltage sensed drops below the reference voltage preset during the keying signal, the cut-off transistor 72 is turned on. When the transistor 72 is turned on, its collector will drop to the negative reference level. At the same time that the transistor 72 reference level goes negative, the negative signal output turns on transistor 90 raising its collector to the positive arc potential. The resistor 81 which is tied to the negative gap supply furnishes a normal turn off signal for the transistor 72. In addition, the resistor 100 feedsback the signal from the collector of the transistor 90 to amplify the error signal and improve the sensitivity of the circuit.

When the collector of the transistor 90 rises to gap positive potential, the complementary pair of transistors 92 and 94 are switched to send the control signal to the multivibrator 26 to reduce machining pulse on-time. It will be seen that the output switch remains off only until the next keyed on signal appears at which time gap conditions are again tested.

Responsive to the state of transistor 90, the next following transistor 118 is turned off. Its turn off sends a signal to the base of the transistor 126 to turn it on and at the same time to turn off transistor 128. As has previously been stated, the pair of transistors 126 and 128 are set to have only two stable stages-either on or off. Once the transistors 126, 128 have changed their states to that state indicating the error condition, the following transistor 144 of the second complementary pair is turned on and the associated capacitor 166 discharges through resistor 170, diode 172 and through the transistor. The error or short circuit condition also turns off the other transistor 146 of the complementary pair and sends a plus polarity signal to the multivibrator 26 to increase the machining pulse off-time. Upon the termination of the short circuit condition, the transistors 126 and 128 return to their normal state. It will be seen that the charging of capacitor 166 through resistor 168 will delay the narrowing of the pulse off-time to its normal duration. This delay has a significant stabilizing influence during the electrical discharge machining process.

The description of operation of the protection system will now be made with respect to the gap open circuit phase of operation. Where open circuit control is desired, the switch SW3 is closed to enable the related portion of the system. Through the keying operation from the emitter of the drive stage transistor 32, comparison is made on a per pulse basis between the voltage level of the reference voltage preset on the potentiometer 190 and the gap voltage sensed through the resistor 196. Whenever the gap voltage exceeds the preset voltage level of the potentiometer 190, transistor 182 will be turned off and transistor 180 will be turned on. With transistor 180 on, a turn off signal is applied from its collector to the base of the transistor 198. With the transistor 198 in its non-conducting state, a negative signal to the base of the transistor 144 through diode 210 and the resistor 150 will turn the transistor 144 on and a negative signal to the base of the transistor 146 through the diode 210 and the resistor 164 will turn the transistor 146 off. In the open circuit condition of the gap, there will of course be no output signal to the second complementary pair through the diode 148. During open circuit condition, the transistor 144 in its conducting state provides a plus signal to rob the minus drive voltage from the multivibrator 26 and reduce cutting current through the increasing of off-time. Once normal gap voltage level returns, the transistor 180 will again be turned off, transistor 198 will be left on so that no negative voltage is applied to the base of complementary transistor pair 144. Therefore, transistor 144 will be turned off to permit the pulse off-time to be returned to its normal duration.

It will thus be seen that we have provided through our invention an improved protection system for an electrical discharge machining apparatus. The system is one which operates to provide reliable control signals to adjust pulse width and to provide the appropriate changes in duty factor during either gap short circuit condition or gap open circuit condition.

We claim:

1. In an electrical discharge machining apparatus for removing material from a conductive workpiece by electrical discharges passed between a tool electrode and the workpiece across a dielectric coolant filled gap, a power source, an electronic output switch having its principal electrodes connected between said power source and the gap, wherein the improvement comprises a system for protecting the gap from short circuit condition comprising a pulser means of selectively variable on-off time for periodically triggering said output switch into conduction to provide machining power pulses to said gap, an electronic cut-off switch operatively connected to said gap for operation in response to an electrical parameter of the gap representative of gap short circuit condition, and a pair of electronic switches coupled in a complementary pair configuration and operatively connected between said cut-off switch and said pulser for providing a control output signal to it for decreasing pulse on-time responsive to operation of said cut-off switch.

2. The combination as set forth in claim 1 wherein a keying means is included in circuit with said electronic output switch and said cut-off switch for providing to it a keying signal for rendering it effective in phase with each machining power pulse.

3. The combination as set forth in claim 2 wherein said cut-off switch has one of its principal electrodes connected to said keying means for rendering it effective during each machining power pulse and wherein said cut-off switch has its other principal electrode operatively connected to the control electrodes of said switches of said complementary pair for turning one on and the other off.

4. The combination as set forth in claim 1 wherein said parameter is gap voltage and wherein a sensing network is connected between a terminal of said gap and the control electrode of said cut-off switch for providing thereto a signal representation of gap voltage.

5. The combination as set forth in claim 4 wherein at least one diode is connected in series between said gap terminal and said control electrode of said cut-off switch for facilitating its operation.

6. The combination as set forth in claim 1 wherein said pulser comprises a pair of electronic switches alternately operative, one in phase with gap on-time and the other in phase with gap off-time, and wherein the output of said complementary pair is operatively connected to said last mentioned switch for interrupting its operation responsive to gap voltage below a predetermined normal level.

7. The combination as set forth in claim 6 wherein said output of said complementary pair is operably connected to both of the aforesaid on-time and off-time switches for decreasing the machining power pulse on-time and increasing the machining power pulse off-time at the same time.

8. The combination as set forth in claim 1 wherein said pair of electronic switches connected in said complementary configuration comprise a pair of transistors, one of NPN polarity and the other of PNP polarity, and wherein said cut-off switch has one of its principal electrodes connected to the bases of both of said pair of transistors for triggering one of said pair on and the other of said pair off responsive to occurrence of gap voltage below a predetermined level.

9. In an electrical discharge machining apparatus for removing material from a conductive workpiece by electrical discharges passed between a tool electrode and the workpiece across a dielectric coolant filled gap; a power source; an electronic output switch having its principal electrodes connected between said power source and said gap; wherein the improvement comprises a circuit for protecting the gap elements from gap short circuit condition comprising a pulser means of selectively variable on-off time for periodically triggering said output switch into conduction to provide machining power pulses to said gap; and a pair of complementary connected switches operatively connected to said pulser; an electronic cut-off switch operatively connected to said gap and operable in response to gap voltage below a predetermined level, said cut-off switch having its control electrode operably connected to one terminal of said gap, one of its principal electrodes connected to a reference voltage source keyed in phase with said machining power pulses, the other of its principal electrodes connected to both the control electrodes of said pair for turning one on and the other off to provide a control output to said pulser to narrow its on-time.

10. In an electrical discharge machining apparatus for removing material from a conductive workpiece by electrical discharges passed between a tool electrode and the workpiece across a dielectric coolant filled gap, a power source, an electronic output switch having its principal electrodes connected between said power source and the gap, wherein the improvement comprises a system for protecting the gap elements from short circuit condition comprising a pulser means of variable on-off time operation for periodically triggering said output switch into conduction to provide machining power pulses to said gap, said pulser of variable on-off time ratio, and a pair of electronic switches coupled in a complementary pair configuration and operatively connected between said gap and said pulser for providing a control output signal to it and altering its on-off time operation responsive to gap voltage below a predetermined level.

11. The combination as set forth in claim 10 wherein an electronic cut-off switch is operatively connected between said gap and said pair for providing a switching signal thereto responsive to gap voltage below said level and wherein a keying means is coupled between the drive signal to said output electronic switch and said cut-off switch for enabling it during machining pulse on-time.

12. The combination as set forth in claim 11 wherein said cut-off switch has one of its principal electrodes coupled to said drive signal through a series resistor for receiving a reference voltage therefrom, said cut-off switch further having its control electrode connected to said gap through at least one series diode for facilitating its switching operation.

13. The combination as set forth in claim 10 wherein said pulser comprises a pair of electronic switches cross coupled for alternate operation in the astable mode, one controlling pulse on-time and the other controlling pulse off-time, and wherein said complementary pair have their control output operatively connected to said switch of said multivibrator controlling pulse on-time.

14. The combination as set forth in claim 13 wherein a second complementary pair is operatively connected between said cut-off switch and said off-time control switch for increasing off-time during said gap short circuit condition.

15. The combination as set forth in claim 14 wherein both of said complementary pairs comprise a pair of transistors, one NPN and the other PNP, said transistors having their opposite phased principal electrodes cross-coupled to provide a common control output therefrom.

16. The combination as set forth in claim 10 wherein a second cut-off switch is operatively connected to said gap for providing a turn-on signal to said second complementary pair for increasing the off-time of said pulses responsive to gap voltage above a predetermined level and representative of gap open circuit condition.

17. In an electrical discharge machining apparatus for electrically removing material from a conductive workpiece by electrical discharges between a tool electrode and the workpiece across a dielectric coolant filled gap, a power source, an electronic output switch connected between said power source and said gap for providing machining power pulses thereto, wherein the improvement comprises a system for reducing current to the gap during gap open circuit such as occurs on initial downfeed, said system comprising a variable on-off time pulser for periodically triggering said output switch into conduction, a cut-off electronic switch operatively connected to said gap and switchable responsive to a gap parameter representative of open circuit condition, and a pair of electronic switches connected in complementary pair configuration, said pair operatively connected between said cut-off switch and said pulser, said pair operable responsive to the switching of said cut-off switch for providing an output signal to said pulser and increasing its pulse off time.

18. The combination as set forth in claim 17 wherein said parameter is gap voltage and wherein said cut-off switch has its control electrode coupled to one terminal of said gap for sensing said gap voltage.

19. The combination as set forth in claim 18 wherein said complementary pair comprises a PNP and an NPN transistor having their opposite polarity principal electrodes cross-connected and wherein the output to said pulser is taken therefrom.

20. In an electrical discharge machining apparatus for electrically removing material from a conductive workpiece by electrical discharges between a tool electrode and the workpiece across a dielectric coolant filled gap, a power source, an electronic output switch having its principal electrodes operably connected between said power source and said gap for providing machining power pulses thereto, wherein the improvement comprises a system for reducing current to the gap during gap open circuit comprising a variable on-time pulser for periodically triggering said output switch into conduction, an electronic cut-off means operably connected to said gap and operable responsive to gap voltage of a magnitude indicating open circuit condition, and a pair of electronic switches connected in complementary pair configuration, said pair operatively connected between said cut-off switch and said pulser for providing an output signal to it and increasing its pulse off-time, and a keying means connected between the drive to said output switch and to said cut-off switch for enabling it during pulse on-time.

21. The combination as set forth in claim 20 wherein said cut-off means comprises a pair of like polarity switches connected in push-pull configuration, one of said switches having a presettable reference voltage connected to its base and the other of said switches having a gap voltage signal connected to its base.

22. The combination as set forth in claim 21 wherein said pulser comprises a multivibrator including a switch controlling machining pulse on-time and a switch controlling machining pulse off-time and wherein said complementary pair has its output operably connected to said switch controlling pulse off-time for increasing machining power pulse off-time responsive to said condition.

23. The combination as set forth in claim 20 wherein a delay means is operatively connected to said complementary pair for delaying the return of said pulse off-time to its normal duration after termination of said gap open circuit condition.

* * * * *